United States Patent

Mihara

[11] Patent Number: 4,534,626
[45] Date of Patent: Aug. 13, 1985

[54] LARGE RELATIVE APERTURE TELEPHOTO LENS SYSTEM

[75] Inventor: Shin-ichi Mihara, Tokyo, Japan

[73] Assignee: Olympus Optical Co., Ltd., Tokyo, Japan

[21] Appl. No.: 524,082

[22] Filed: Aug. 17, 1983

[30] Foreign Application Priority Data

Aug. 24, 1982 [JP] Japan .................. 57-145490

[51] Int. Cl.³ .................. G02B 9/64; G02B 13/02
[52] U.S. Cl. .................. 350/454; 350/463
[58] Field of Search .................. 350/454, 463

[56] References Cited

U.S. PATENT DOCUMENTS 4,176,913 12/1979 Nakamura et al.

FOREIGN PATENT DOCUMENTS 56-13926 4/1981 Japan .
58-27115 2/1983 Japan .

*Primary Examiner*—John K. Corbin
*Assistant Examiner*—Rebecca D. Gass
*Attorney, Agent, or Firm*—Cushman, Darby & Cushman

[57] ABSTRACT

A large relative aperture telephoto lens system comprising a first converging lens group, a diverging lens group and a second converging lens group, arranged in said first lens group being a first positive lens component made of a glass material having a large anomalous partial dispersion ratio $\theta_i$, a negative lens component made of a glass material having a small anomalous partial dispersion ratio $\theta_i$ and at least one of a second and third positive lens components made of a glass material having a large anomalous partial dispersion ratio $\theta_i$, whereby longitudinal chromatic aberration is corrected to a very low level.

11 Claims, 13 Drawing Figures

LARGE RELATIVE APERTURE TELEPHOTO LENS SYSTEM

BACKGROUND OF THE INVENTION (a) Field of the Invention

The present invention relates to a high performance telephoto lens system having a large relative aperture ratio and corrected chromatic aberration due to the secondary spectrum.

(b) Description of the Prior Art

Recently, large aperture ratios such as F/2.0 or F/2.8, high photographing performance and shorter minimum photographing destance as well as light weight and high operability for focusing are desired even for telephoto lens systems having focal lengths on the order of 200 mm to 300 mm.

As lens systems so designed as to satisfy the desire, there have conventionally been known lens systems which comprise lenses made of a glass material having an especially low dispersing power and adopts an inner focusing system which performs focusing by shifting certain lens(es) in the lens system. As an example of these lens systems, there exists Japanese patent application No. 125218/81 (Japanese unexamined published patent application No. 27115/83) of the inventor now U.S. Pat. No. 4,457,595. This lens system is a high performance, larger aperture ratio type adopting a rear focus system utilizing a floating method (preventing variation of aberration by moving specific lens components independently of other lens components) in which three lens components (two lens components and a lens group) arranged on the rear side are shifted for focusing. This lens system has made it possible to perform focusing on objects located at infinite distance to a short distance corresponding to a photographing magnification level on the order of 1/10 with little variations of aberrations caused by moving said lens components.

This lens system uses a glass material having anomalous dispersion ratio for eliminating the secondary spectrum. However, a high degree of longitudinal chromatic aberration due to the secondary spectrum still remains in the said lens system, and it can not fully exhibit yet the effect of the focusing system which functions to correct aberrations produced by varying distance to an object to be photographed.

In order to correct the longitudinal chromatic aberration due to the secondary spectrum, it is sufficient to make the image point free from chromatic aberration. When C line and F line are made achromatic considering rays coming from infinite distance in a lens system composed of thin lens elements, chromatic aberration of g line is expressed by the following formula:

$$\Delta sg = -f^2 \Sigma \frac{h_i^2 \theta_i}{f_i \nu_i}$$

wherein the reference symbol f represents focal length of the lens system as a whole, the reference symbol $\nu_i$ designates Abbe's number of ith lens component, the reference symbol $\theta_i$ denotes partial dispersion ratio $$\left( \frac{n_g - n_F}{n_F - n_C} \right),$$

the reference symbol $h_i$ represents height of incidence on the ith lens surface when that on the first lens surface is taken as 1, and reference symbol $f_i$ designates focal length of ith lens component.

Since $\Delta Sg$ generally has a positive value, positive lens components should have large $\theta_i$, whereas negative lens components should have small $\theta_i$ even when they are made of glass materials having the same Abbe's number. Further, it is effective for correction of said chromatic aberration to use such special glass materials for lens components having $h_i^2/f_i$ as large as possible.

The lens system disclosed by the above-mentioned Japanese unexamined published patent application No. 27115/83 has a lens composition similar to that of the lens system according to the present invention.

Speaking concretely, either of the lens systems comprises a first converging lens group, a diverging lens group and a second converging lens group. Further, said first converging lens group comprises a positive lens component, a positive lens component, a negative lens component and a positive lens component; the second and third positive lens components being made of an anomalous dispersion glass material having a partial dispersion ratio larger than those of general glass materials. However, the first positive lens component having the largest $h_i^2/f_i$ out of the lens elements arranged in the first converging lens group and the negative lens component are made of the general glass materials. As a result, it is difficult to minimize $\Delta Sg$ in the lens system though it uses the anomalous partial dispersion glass material which requires high material cost and machining cost.

SUMMARY OF THE INVENTION

A primary object of the present invention is to provide a large relative aperture ratio telephoto lens system in which chromatic aberration due to the secondary spectrum is remarkably reduced by using a glass material having anomalous partial dispersion ratio $\theta_i$ larger than that of the general glass material for the first positive lens component, a glass material having anomalous partial dispersion ratio $\theta_i$ smaller than that of general glass material for the negative lens component, and a glass material having anomalous partial dispersion ratio $\theta HD i$ larger than that of the general glass material for at least one of the second and third positive lens components arranged in the first converging lens group having the largest $h_i^2/f_i$.

Another object of the present invention is to provide a large relative aperture ratio telephoto lens system adopting a rear focusing system comprising a floating system which serves for maintaining favorably corrected aberrations even when said lens system is focused on an object located at a short distance.

The large relative aperture ratio telephoto lens system according to the present invention comprises a first converging lens group, a diverge lens group and a second converging lens group arranged sequentially from the object side. Said first converging lens group comprises a first positive lens component, a second positive lens component, a negative lens component and a third positive lens component arranged sequentially from the object side, said diverging lens group is arranged with a narrow airspace reserved from said first converging lens group and comprises two negative cemented lens components, and said second converging lens group comprises a positive lens component, a negative lens component and a positive lens component all of which are single-element components or some of which are cemented lens components.

The large relative aperture ratio telephoto lens system according to the present invention having the above-described composition is further characterized in that it is so designed as to correct longitudinal chromatic aberration due to the secondary spectrum sufficiently favorably by using a glass material having a small Abbe's number $\nu_1$ and large anomalous partial dispersion ratio $\theta_1$ for said first positive lens component having a large $h_i^2/f_i$, a glass material having a small Abbe's number $\nu_3$ and small anomalous partial dispersion ratio $\theta_3$ for said negative lens component, and a glass material having anomalous partial dispersion ratio similar to that of the glass material for said first positive lens component for at least one of said second and third positive lens components. In other words, the telephoto lens system according to the present invention is characterized in that it satisfies the following conditions (1) through (3):

$$\nu_1 > 80, \theta_1 > 0.53 \quad (1)$$

$$\nu_3 < 45, \theta_3 < 0.575 \quad (2)$$

$$\nu_p > 80, \theta_p > 0.53 \quad (3)$$

wherein the reference symbol $\nu_p$ represents Abbe's number of said second and/or third positive lens component, and the reference symbol $\theta_p$ designates partial dispersion ratio of said second and/or third positive lens component. When Abbe's number and partial dispersion ratio of said second positive lens component are represented by $\nu_2$ and $\theta_2$ respectively, and Abbe's number and partial dispersion ratio of said third positive lens component are designated by $\nu_4$ and $\theta_4$ respectively, the condition (3) is expressed as follows:

$$\nu_2 > 80, \theta_2 > 0.53$$

or $$\nu_4 > 80, \theta_4 > 0.53.$$

When the upper or lower limits defined by the above-mentioned conditions (1) through (3) are exceeded, longitudinal chromatic aberration due to the secondary spectrum is aggravated to an unallowable degree, making it impossible to obtain a high performance telephoto lens system having a large relative aperture ratio.

When a light-weight high operability type of focusing system, i.e., an inner focusing system performing focusing by shifting certain lens components is adopted in the telephoto lens system having the composition described above, aberrations are generally varied at focusing time. As a result, aberrations are aggravated when the lens system is focused on an object located at a short distance though aberrations are corrected favorably when the lens system is focused on an object located at infinite distance.

In order to prevent aberrations from being aggravated by focusing the lens system on an object located at a short distance, it is necessary to prevent variation of at least spherical aberration, astigmatism and chromatic aberration to the possible minimum regardless of variation of object point. When spherical aberration varies slightly, favorable images are unobtainable for objects located at infinite to short distances unless astigmatism (curvature of image plane) is varied to a degree required and sufficient for the variation of spherical aberration.

In order to obtain favorable images of objects located at distances from infinite to short distances, it is necessary to split a movable lens component for focusing into three components and perform focusing while changing their relative positional relationship. In case of the inner focusing system in which two lens components only are moved, spherical aberration and chromatic aberration only can be corrected at most but astigmatism cannot be corrected sufficiently when the lens system is focused on an object located at a short distance.

The telephoto lens system according to the present invention is so designed as to correct spherical aberration mainly by changing relative positional relationship between the two lens components arranged in the diverging lens group, and suppress variation of astigmatism mainly by changing relative positional relationship between the second converging lens group and diverging lens group. That is to say, it is possible to obtain favorable images for objects located at infinite to short distance corresponding to a photographing magnification of approx. 1/10 by adopting the afore-mentioned focusing system for the high performance lens system according to the present invention in which flare due to chromatic aberration is corrected as described above.

The large relative aperture ratio telephoto lens system having the above-described composition and satisfying the conditions (1) through (3) can accomplish the object of the present invention. However, said lens system can be made more favorable when it is so designed as to satisfy the following conditions (4) through (7):

$$0.7\phi < \phi_1 < 1.3\phi \quad (4)$$

$$\left(\phi = \frac{1}{f}, \phi_1 = \frac{1}{f_1}\right)$$

$$0.08 < n_5 - n_6 \quad (5)$$

$$10 < \nu_8 - \nu_7 < 45 \quad (6)$$

$$0.4f < \left|\left(\frac{1}{f_5} + \frac{1}{f_6}\right)^{-1}\right| < 0.55f \quad (7)$$

wherein the reference symbols $n_5$ and $n_6$ represent refractive indices of the two lens elements of the cemented doublet arranged on the object side in the diverging lens group, the reference symbols $\nu_7$ and $\nu_8$ designate Abbe's numbers of the two lens elements of the cemented doublet arranged on the image side in said diverging lens group, the reference symbol $f_1$ denote focal length of the first positive lens component arranged in the first converging lens group, the reference symbol $f_5$ represents focal length of the cemented doublet arranged on the object side in the diverging lens group, the reference symbol $f_6$ designates focal length of the cemented doublet arranged on the image side on said diverging lens group, and the reference symbol f denotes focal length of the lens system as a whole.

Out of the above-mentioned conditions, the condition (4) defines power of the first positive lens component arranged in the first converging lens group. If the lower limit of this condition is exceeded, it will be impossible to minimize the secondary spectrum. If the upper limit of the condition (4) is exceeded, high-order spherical aberration will be unallowable. Since this high-order spherical aberration is balanced with aberration produced by the lens components having negative power in the diverging lens group, high-order aberration is apt to be produced at focusing time when the above-described inner focusing system is adopted.

The condition (5) defines difference in refractive index between the two (positive and negative) lens elements of the cemented doublet arranged on the object side in the diverging lens group. When the difference in refractive index is larger than the lower limit of the condition (5), it is possible to minimize undercorrection of spherical aberration, swelling of spherical aberration at its zonal section toward the negative side and variations of astigmatism and other aberration when the lens system is focused on an object located at a short distance. This effect is more remarkable than that which would be obtained by reserving a difference in refractive index between the two lens elements of the cemented doublet arranged on the image side in the diverging lens group.

The condition (6) defines a difference in Abbe's number between the positive and negative lens elements of the cemented doublet arranged on the image side in the diverging lens group. By reserving a large difference in Abbe's number between the two lens elements of the cemented doublet arranged on the image side as defined by the condition (6), it is possible to minimize variation of lateral chromatic aberration and the tendency to overcorrect marginal spherical aberration of the g line. If this condition is not satisfied, undesirable effects such as remarkable variation of lateral chromatic aberration will result.

The condition (7) defines powers of the two cemented doublets arranged in the diverging lens group. If the upper limit of this condition is exceeded, aberrations are apt to be produced. If the lower limit of this condition is exceeded, shifting distances of these lens components will be increased undesirably.

In addition, it is more desirable to minimize variations of aberrations in the telephoto lens system according to the present invention by designing it so as to satisfy the following conditions (8) through (10):

$$0.08 < n_7 - n_8 \quad (8)$$

$$0.1 < n_9 - n_{10} \quad (9)$$

$$10 < \nu_{11} - \nu_{10} \quad (10)$$

wherein the reference symbols $n_7$ and $n_8$ represent refractive indices of the two lens elements of the movable lens component arranged on the image side in the diverging lens group, the reference symbol $n_9$ designates refractive index of the positive lens component arranged on the object side in the second converging lens group, the reference symbol $n_{10}$ denotes refractive index of the negative lens component arranged in the second converging lens group, the reference symbol $\nu_{10}$ represents Abbe's number of the negative lens component arranged in the second converging lens group, and the reference symbol $\nu_{11}$ designates Abbe's number of the positive lens component arranged on the image side in the second lens group.

The condition (8) defines a difference in refractive index between the two lens elements of the movable lens component arranged on the image side in the diverging lens group. This movable lens component is effective for minimizing Petzval's sum since its elements have higher power than those of the lens elements of the movable lens component arranged on the object side. If the condition (8) is not satisfied, Petzval's sum will undesirably be enlarged. When the positive lens element and negative lens element of the lens component arranged on the image side have high and low refractive indices respectively as defined by the condition (8), variations of aberrations are minimized when the telephoto lens system is focused on an object located at a short distance. However, the effect is lower than that obtainable by designing the two lens elements of the movable lens component on the object side as described above.

The condition (9) defines refractive index of the second converging lens group so as to select a desirable Petzval's sum and correct astigmatism favorably. If this condition is not satisfied, Petzval's sum will be undesirable and astigmatism will not be corrected favorably. The afore-mentioned correcting effect will be enhanced by selecting a large difference $n_{11} - n_{10}$ in refractive index between refractive index $n_{11}$ of the negative lens component and refractive index $n_{10}$ of the positive lens component arranged on the image side of the second converging lens group in addition to the condition (9).

The condition (10) defines Abbe's number of the second converging lens group for facilitating to balance longitudinal chromatic aberration and lateral chromatic aberration when the telephoto lens system is focused on an object located at infinite distance. If this condition is not satisfied, longitudinal chromatic aberration will not be balanced with lateral chromatic aberration. In addition, it is more effective for balancing the above-mentioned two type of chromatic aberrations better to select a large difference $\nu_9 - \nu_{10}$ in Abbe's number between the positive lens component and negative lens component arranged in the second converging lens group.

DETAILED DESCRIPTION OF THE PREFERRED EMBODIMENT

Figure 1:
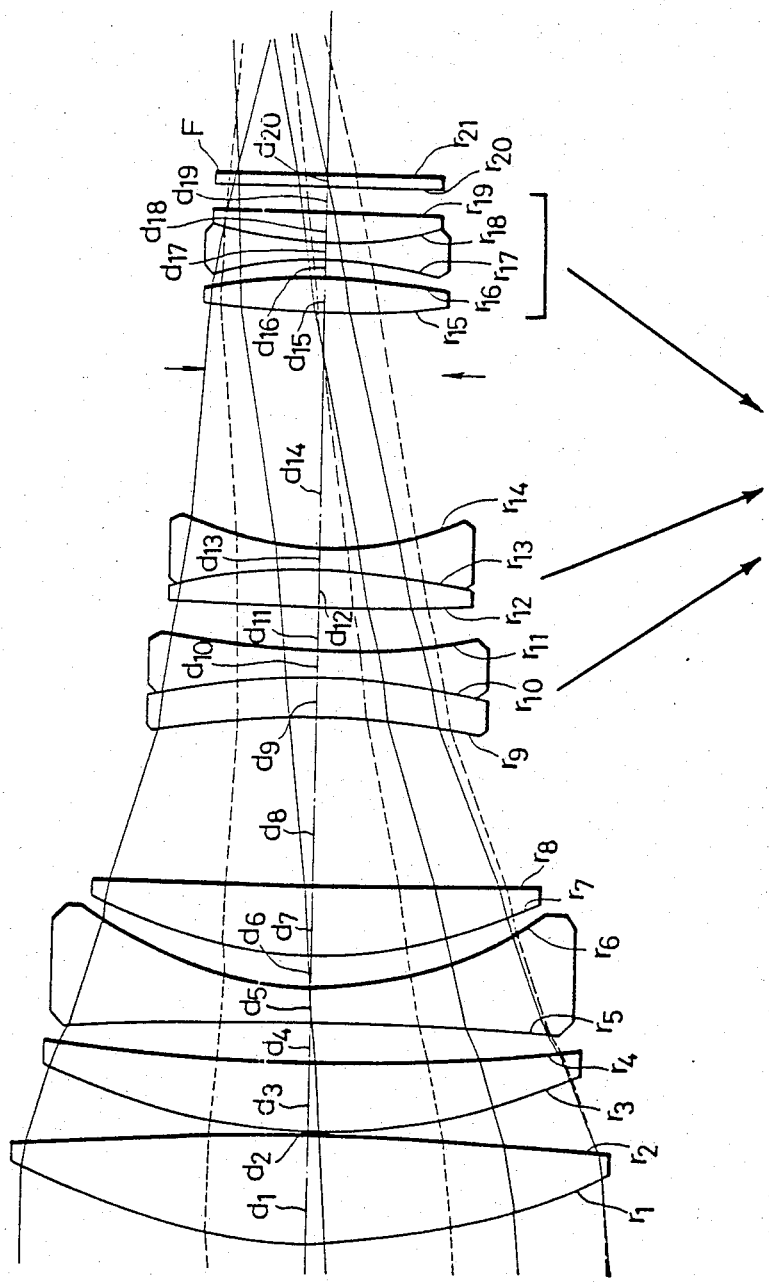
FIG. 1 shows a sectional view illustrating the composition of the large relative aperture ratio telephoto lens system according to the present invention.

Now, some preferred embodiments of the large relative aperture ratio telephoto lens system according to the present invention will be described below:

Embodiment 1

$r_1 = 53.4890$
$\quad d_1 = 8.6598 \quad n_1 = 1.49700 \quad \nu_1 = 81.61$
$r_2 = -253.9770$
$\quad d_2 = 0.2021$
$r_3 = 47.1587$ -continued

|  |  |  |  |
|---|---|---|---|
| | $d_3 = 6.8041$ | $n_2 = 1.49700$ | $\nu_2 = 81.61$ |
| $r_4 = 372.5134$ | | | |
| | $d_4 = 3.0103$ | | |
| $r_5 = -310.9050$ | | | |
| | $d_5 = 2.8866$ | $n_3 = 1.65412$ | $\nu_3 = 39.70$ |
| $r_6 = 34.3938$ | | | |
| | $d_6 = 2.8866$ | | |
| $r_7 = 42.6486$ | | | |
| | $d_7 = 5.6082$ | $n_4 = 1.61800$ | $\nu_4 = 63.38$ |
| $r_8 = 318.7505$ | | | |
| | $d_8 = D_1$ | | |
| $r_9 = -85.4181$ | | | |
| | $d_9 = 3.5052$ | $n_5 = 1.73400$ | $\nu_5 = 51.49$ |
| $r_{10} = -45.4995$ | | | |
| | $d_{10} = 2.0619$ | $n_6 = 1.46450$ | $\nu_6 = 65.94$ |
| $r_{11} = 62.7660$ | | | |
| | $d_{11} = D_2$ | | |
| $r_{12} = -1545.6106$ | | | |
| | $d_{12} = 3.2990$ | $n_7 = 1.68893$ | $\nu_7 = 31.08$ |
| $r_{13} = -43.4010$ | | | |
| | $d_{13} = 1.6495$ | $n_8 = 1.50847$ | $\nu_8 = 60.83$ |
| $r_{14} = 28.0698$ | | | |
| | $d_{14} = D_3$ | | |
| $r_{15} = 53.8086$ | | | |
| | $d_{15} = 3.0928$ | $n_9 = 1.73400$ | $\nu_9 = 51.49$ |
| $r_{16} = -44.0473$ | | | |
| | $d_{16} = 1.2371$ | | |
| $r_{17} = -41.2192$ | | | |
| | $d_{17} = 1.2371$ | $n_{10} = 1.62004$ | $\nu_{10} = 36.25$ |
| $r_{18} = 28.2067$ | | | |
| | $d_{18} = 2.7629$ | $n_{11} = 1.67790$ | $\nu_{11} = 55.33$ |
| $r_{19} = -223.1966$ | | | |
| | $d_{19} = 1.6495$ | | |
| $r_{20} = \infty$ | | | |
| | $d_{20} = 1.0309$ | $n_{12} = 1.51633$ | $\nu_{12} = 64.15$ |
| $r_{21} = \infty$ | | | |
| $f = 100$, | $2\omega = 10.2°$ | | |
| $\theta_1 = 0.53695$, | $\theta_2 = 0.53695$, | $\theta_3 = 0.56978$ | |
| $\theta_4 = 0.54359$ | | | |
| $f_1 = 89.7$, | $f_5 = -98.8$, | $f_6 = -69.7$ | |

$$\left(\frac{1}{f_5} + \frac{1}{f_6}\right)^{-1} = -40.87$$

| object point | $D_1$ | $D_2$ | $D_3$ | $f$ |
|---|---|---|---|---|
| $\infty$ | 12.622 | 4.991 | 17.684 | 100.000 |
| 3.05 m | 13.368 | 5.403 | 15.906 | 100.093 |
| 1.03 m | 15.709 | 6.434 | 11.915 | 99.882 |

Embodiment 2

|  |  |  |  |
|---|---|---|---|
| $r_1 = 59.8879$ | | | |
| | $d_1 = 8.6593$ | $n_1 = 1.45650$ | $\nu_1 = 90.80$ |
| $r_2 = -251.3768$ | | | |
| | $d_2 = 0.2021$ | | |
| $r_3 = 44.1635$ | | | |
| | $d_3 = 6.8041$ | $n_2 = 1.49700$ | $\nu_2 = 81.61$ |
| $r_4 = 233.0781$ | | | |
| | $d_4 = 3.0103$ | | |
| $r_5 = -862.4809$ | | | |
| | $d_5 = 2.8866$ | $n_3 = 1.65412$ | $\nu_3 = 39.70$ |
| $r_6 = 34.9286$ | | | |
| | $d_6 = 2.8866$ | | |
| $r_7 = 42.2330$ | | | |
| | $d_7 = 5.6082$ | $n_4 = 1.61800$ | $\nu_4 = 63.38$ |
| $r_8 = 1869.8698$ | | | |
| | $d_8 = D_1$ | | |
| $r_9 = -78.7197$ | | | |
| | $d_9 = 3.5052$ | $n_5 = 1.73400$ | $\nu_5 = 51.49$ |
| $r_{10} = -41.0364$ | | | |
| | $d_{10} = 2.0619$ | $n_6 = 1.46450$ | $\nu_6 = 65.94$ |
| $r_{11} = 57.4054$ | | | |
| | $d_{11} = D_2$ | | |
| $r_{12} = -396.6589$ | | | |
| | $d_{12} = 3.2990$ | $n_7 = 1.74077$ | $\nu_7 = 27.79$ |
| $r_{13} = -45.4103$ | | | |
| | $d_{13} = 1.6495$ | $n_8 = 1.50847$ | $\nu_8 = 60.83$ |
| $r_{14} = 26.7992$ | | | |
| | $d_{14} = D_3$ | | |
| $r_{15} = 49.1045$ | | | |
| | $d_{15} = 3.0923$ | $n_9 = 1.77250$ | $\nu_9 = 49.66$ |
| $r_{16} = -46.2095$ | | | |
| | $d_{16} = 1.2371$ | | |

-continued

|  |  |  |  |
|---|---|---|---|
| $r_{17} = -43.3235$ | | | |
| | $d_{17} = 1.2371$ | $n_{10} = 1.64769$ | $\nu_{10} = 33.80$ |
| $r_{18} = 28.8379$ | | | |
| | $d_{18} = 2.7629$ | $n_{11} = 1.67790$ | $\nu_{11} = 55.33$ |
| $r_{19} = -317.9854$ | | | |
| | $d_{19} = 1.6495$ | | |
| $r_{20} = \infty$ | | | |
| | $d_{20} = 1.0309$ | $n_{12} = 1.51633$ | $\nu_{12} = 64.15$ |
| $r_{21} = \infty$ | | | |
| $f = 100$, | $2\omega = 10.2°$ | | |
| $\theta_1 = 0.53479$, | $\theta_2 = 0.53695$, | $\theta_3 = 0.56978$ | |
| $\theta_4 = 0.54359$ | | | |
| $f_1 = 106.9$, | $f_5 = -91.7$, | $f_6 = -63.7$ | |

$$\left(\frac{1}{f_5} + \frac{1}{f_6}\right)^{-1} = -37.59$$

| object point | $D_1$ | $D_2$ | $D_3$ | $f$ |
|---|---|---|---|---|
| $\infty$ | 13.454 | 5.287 | 17.882 | 100.000 |
| 3.05 m | 14.120 | 5.699 | 16.850 | 100.115 |
| 1.03 m | 16.195 | 6.730 | 15.201 | 99.906 |

Embodiment 3

|  |  |  |  |
|---|---|---|---|
| $r_1 = 57.7405$ | | | |
| | $d_1 = 8.6598$ | $n_1 = 1.45650$ | $\nu_1 = 90.80$ |
| $r_2 = -259.0883$ | | | |
| | $d_2 = 0.2021$ | | |
| $r_3 = 46.3425$ | | | |
| | $d_3 = 6.8041$ | $n_2 = 1.61800$ | $\nu_2 = 63.38$ |
| $r_4 = 218.5592$ | | | |
| | $d_4 = 3.0103$ | | |
| $r_5 = -2292.0957$ | | | |
| | $d_5 = 2.8866$ | $n_3 = 1.65412$ | $\nu_3 = 39.70$ |
| $r_6 = 33.3375$ | | | |
| | $d_6 = 2.8866$ | | |
| $r_7 = 41.5626$ | | | |
| | $d_7 = 5.6082$ | $n_4 = 1.49700$ | $\nu_4 = 81.61$ |
| $r_8 = 345.6092$ | | | |
| | $d_8 = D_1$ | | |
| $r_9 = -80.4007$ | | | |
| | $d_9 = 3.5052$ | $n_5 = 1.73400$ | $\nu_5 = 51.49$ |
| $r_{10} = -48.8973$ | | | |
| | $d_{10} = 2.0619$ | $n_6 = 1.46450$ | $\nu_6 = 65.94$ |
| $r_{11} = 73.0621$ | | | |
| | $d_{11} = D_2$ | | |
| $r_{12} = 387.0852$ | | | |
| | $d_{12} = 3.2990$ | $n_7 = 1.68893$ | $\nu_7 = 31.08$ |
| $r_{13} = -41.6552$ | | | |
| | $d_{13} = 1.6495$ | $n_8 = 1.51742$ | $\nu_8 = 52.41$ |
| $r_{14} = 29.3620$ | | | |
| | $d_{14} = D_3$ | | |
| $r_{15} = 59.3546$ | | | |
| | $d_{15} = 3.0928$ | $n_9 = 1.73400$ | $\nu_9 = 51.49$ |
| $r_{16} = -43.3501$ | | | |
| | $d_{16} = 1.2371$ | | |
| $r_{17} = -41.1688$ | | | |
| | $d_{17} = 1.2371$ | $n_{10} = 1.61293$ | $\nu_{10} = 37.00$ |
| $r_{18} = 29.1501$ | | | |
| | $d_{18} = 2.7629$ | $n_{11} = 1.67790$ | $\nu_{11} = 55.33$ |
| $r_{19} = -250.4883$ | | | |
| | $d_{19} = 1.6495$ | | |
| $r_{20} = \infty$ | | | |
| | $d_{20} = 1.0309$ | $n_{12} = 1.51633$ | $\nu_{12} = 64.15$ |
| $r_{21} = \infty$ | | | |
| $f = 100$, | $2\omega = 10.2°$ | | |
| $\theta_1 = 0.53479$, | $\theta_2 = 0.54359$, | $\theta_3 = 0.56978$ | |
| $\theta_4 = 0.53695$ | | | |
| $f_1 = 104.3$, | $f_5 = -99.8$, | $f_6 = -86.5$ | |

$$\left(\frac{1}{f_5} + \frac{1}{f_6}\right)^{-1} = -46.34$$

| object point | $D_1$ | $D_2$ | $D_3$ | $f$ |
|---|---|---|---|---|
| $\infty$ | 14.205 | 4.076 | 18.300 | 100.000 |
| 3.05 m | 15.056 | 4.488 | 16.418 | 100.040 |
| 1.03 m | 17.732 | 5.519 | 12.092 | 99.817 |

Embodiment 4

|  |  |  |  |
|---|---|---|---|
| $r_1 = 53.6493$ | | | |
| | $d_1 = 9.8969$ | $n_1 = 1.49700$ | $\nu_1 = 81.61$ |
| $r_2 = -233.4347$ | | | |

-continued

| | | | |
|---|---|---|---|
| | $d_2 = 0.2021$ | | |
| $r_3 = 50.3090$ | | | |
| | $d_3 = 5.9794$ | $n_2 = 1.61700$ | $\nu_2 = 62.79$ |
| $r_4 = 192.5768$ | | | |
| | $d_4 = 3.0103$ | | |
| $r_5 = -408.8411$ | | | |
| | $d_5 = 2.8866$ | $n_3 = 1.65412$ | $\nu_3 = 39.70$ |
| $r_6 = 33.9410$ | | | |
| | $d_6 = 2.8866$ | | |
| $r_7 = 41.2077$ | | | |
| | $d_7 = 5.6082$ | $n_4 = 1.49700$ | $\nu_4 = 81.61$ |
| $r_8 = 747.8051$ | | | |
| | $d_8 = D_1$ | | |
| $r_9 = -79.7637$ | | | |
| | $d_9 = 3.5052$ | $n_5 = 1.73400$ | $\nu_5 = 51.49$ |
| $r_{10} = -49.0299$ | | | |
| | $d_{10} = 2.0619$ | $n_6 = 1.46450$ | $\nu_6 = 65.94$ |
| $r_{11} = 69.9918$ | | | |
| | $d_{11} = D_2$ | | |
| $r_{12} = 626.3769$ | | | |
| | $d_{12} = 3.2990$ | $n_7 = 1.68893$ | $\nu_7 = 31.08$ |
| $r_{13} = -40.7052$ | | | |
| | $d_{13} = 1.6495$ | $n_8 = 1.51742$ | $\nu_8 = 52.41$ |
| $r_{14} = 30.5153$ | | | |
| | $d_{14} = D_3$ | | |
| $r_{15} = 63.0751$ | | | |
| | $d_{15} = 3.0928$ | $n_9 = 1.77250$ | $\nu_9 = 49.66$ |
| $r_{16} = -44.3549$ | | | |
| | $d_{16} = 1.2371$ | | |
| $r_{17} = -41.3072$ | | | |
| | $d_{17} = 1.2371$ | $n_{10} = 1.62004$ | $\nu_{10} = 36.25$ |
| $r_{18} = 29.8059$ | | | |
| | $d_{18} = 2.7629$ | $n_{11} = 1.67790$ | $\nu = 55.33$ |
| $r_{19} = -231.6445$ | | | |
| | $d_{19} = 1.6495$ | | |
| $r_{20} = \infty$ | | | |
| | $d_{20} = 1.0309$ | $n_{12} = 1.51633$ | $\nu_{12} = 64.15$ |
| $r_{21} = \infty$ | | | |
| $f = 100,$ | $2\omega = 10.2°$ | | |
| $\theta_1 = 0.53695,$ | $\theta_2 = 0.54379,$ | $\theta_3 = 0.54978$ | |
| $\theta_4 = 0.53695$ | | | |
| $f_1 = 88.8,$ | $f_5 = -96.2,$ | $f_6 = -86.8$ | |

$$\left(\frac{1}{f_5} + \frac{1}{f_6}\right)^{-1} = -45.63$$

| object point | $D_1$ | $D_2$ | $D_3$ | f |
|---|---|---|---|---|
| ∞ | 14.211 | 4.310 | 18,122 | 100.000 |
| 3.05 m | 15.144 | 5.722 | 16.158 | 100.085 |
| 1.03 m | 18.432 | 5.753 | 11.510 | 99.948 | wherein the reference symbols $r_1$ through $r_{21}$ represent radii of curvature on the surface of the respective lens elements, the reference symbols $d_1$ through $d_{20}$ designate thicknesses of the respective lens elements and airspaces reserved therebetween, the reference symbols $n_1$ through $n_{12}$ denote refractive indices of the respective lens elements, the reference symbols $\nu_1$ through $\nu_{12}$ represent Abbe's numbers of the respective lens elements and the reference symbol $2\omega$ designates field angle of the telephoto lens system. Each set of the above-mentioned numerical data includes those of a filter F. Each of the above-mentioned embodiments is so designed as to perform focusing on objects located at infinite to short distances by shifting three lens components (two lens components and a lens group) independently to change their relative positional relationship. The airspaces varied by shifting these three lens components are $d_8=D_1$, $d_{11}=D_2$ and $d_{13}=D_1$, and their values at object points of infinite distance, 3.05 m and 1.03 m are specified in the above-mentioned numerical data.

Figure 2:
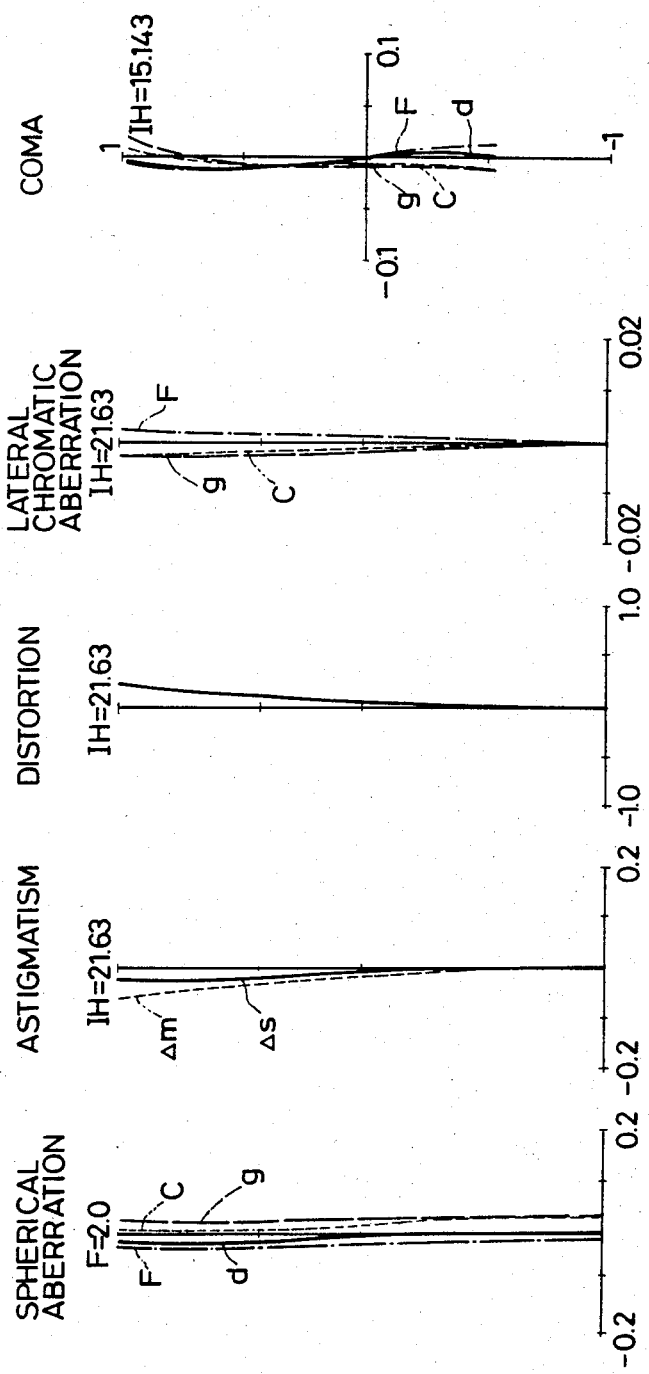
FIG. 2 through FIG. 4 show curves illustrating the aberration characteristics of Embodiment 1 of the telephoto lens system according to the present invention.
Figure 3:
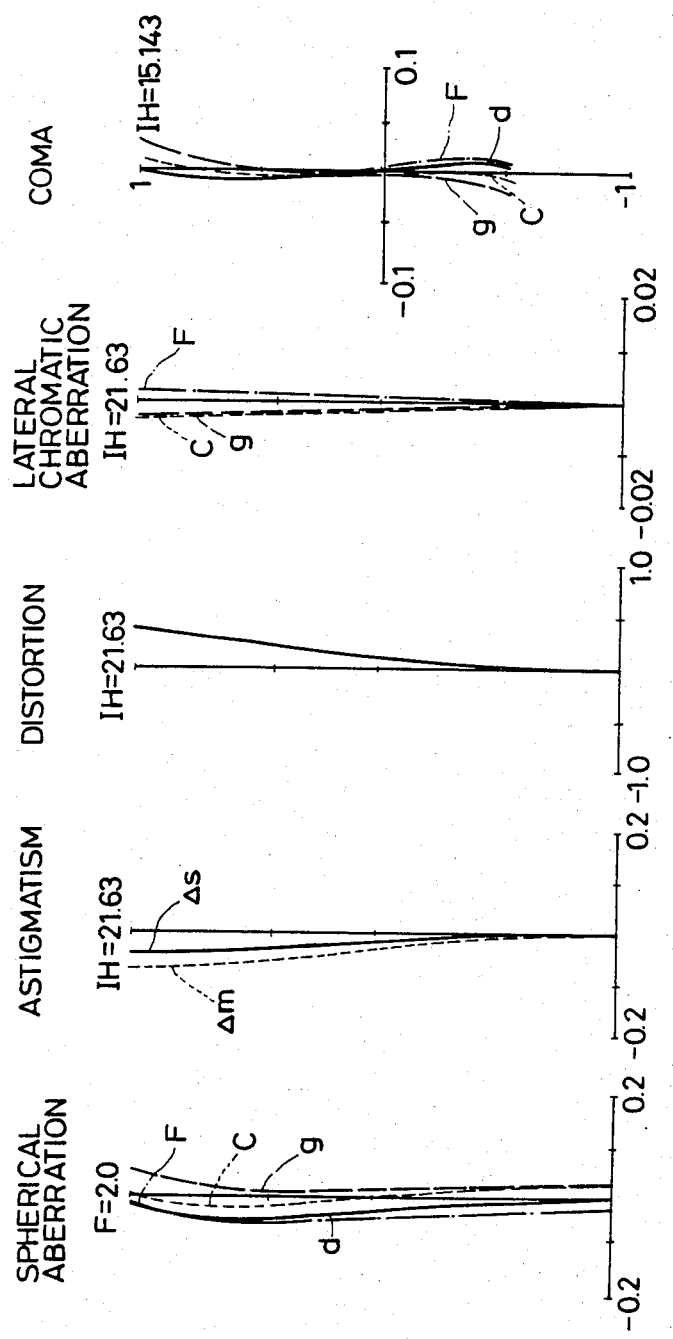
Figure 4:
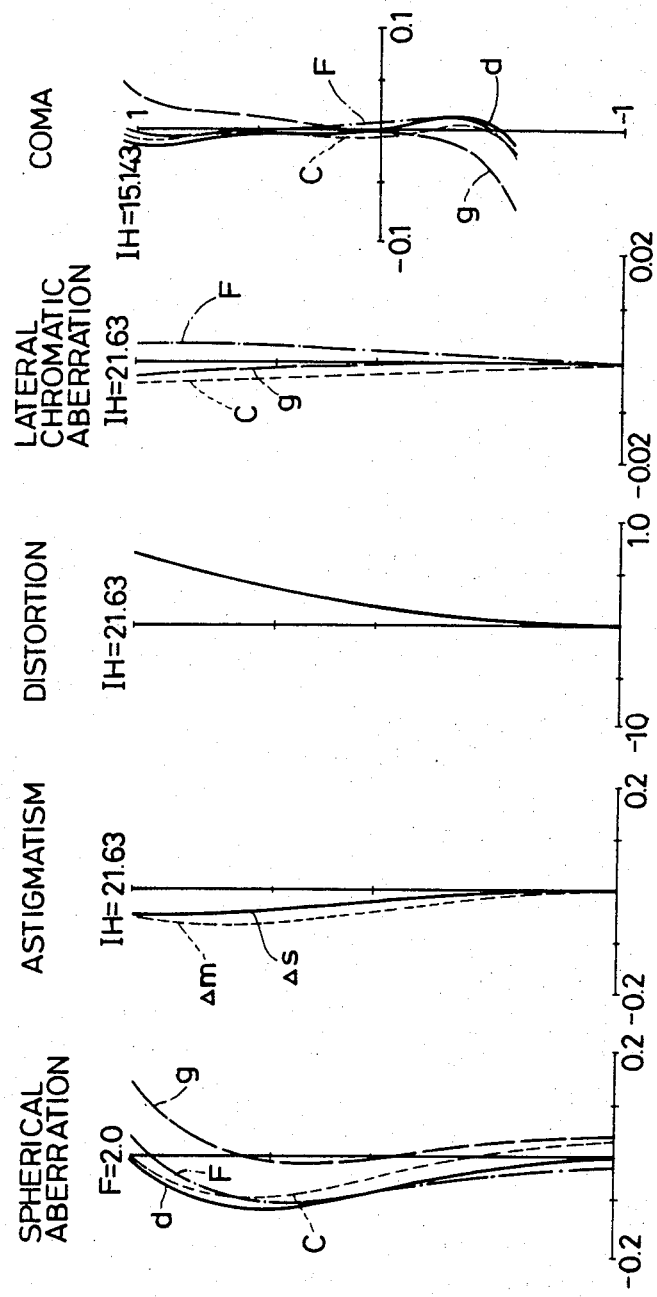
Figure 5:
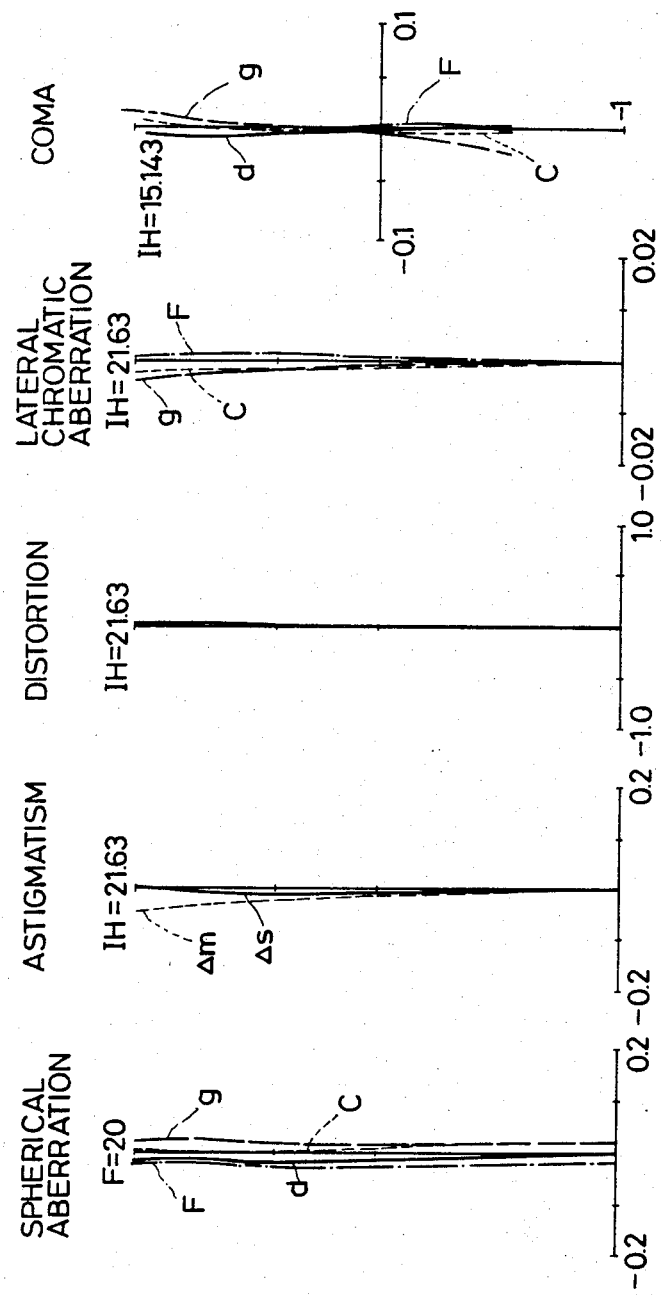
FIG. 5 through FIG. 7 show curves illustrating the aberration characteristics of Embodiment 2 of the present invention.
Figure 6:
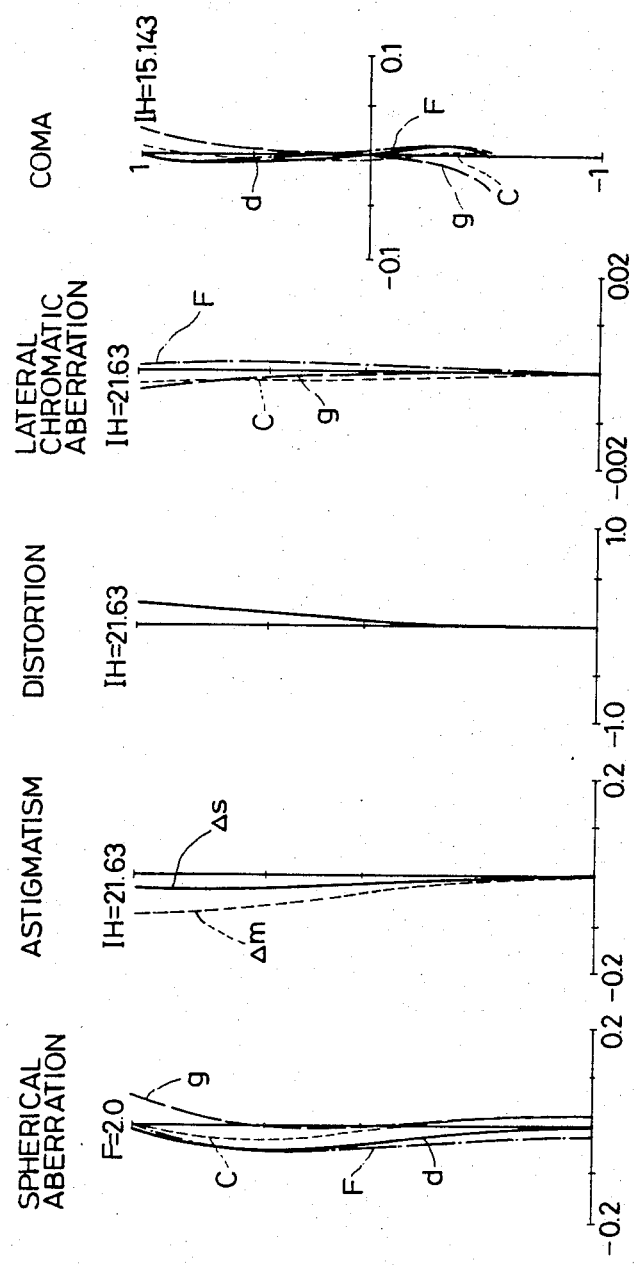
Figure 7:
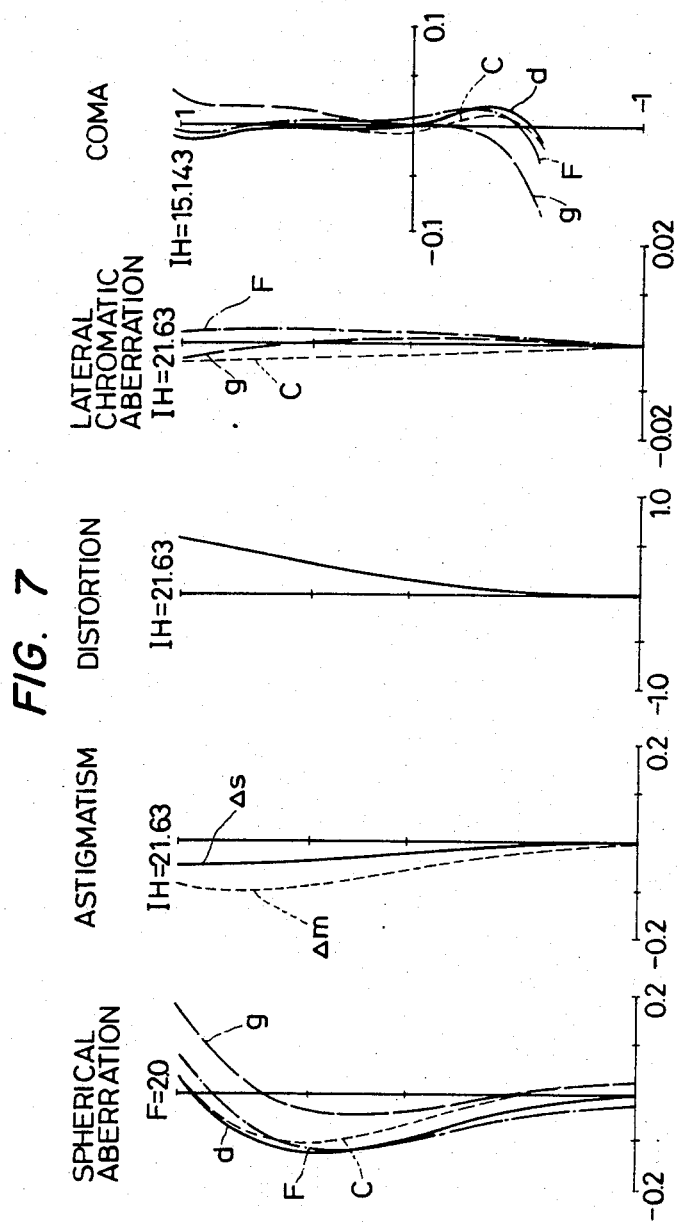
Figure 8:
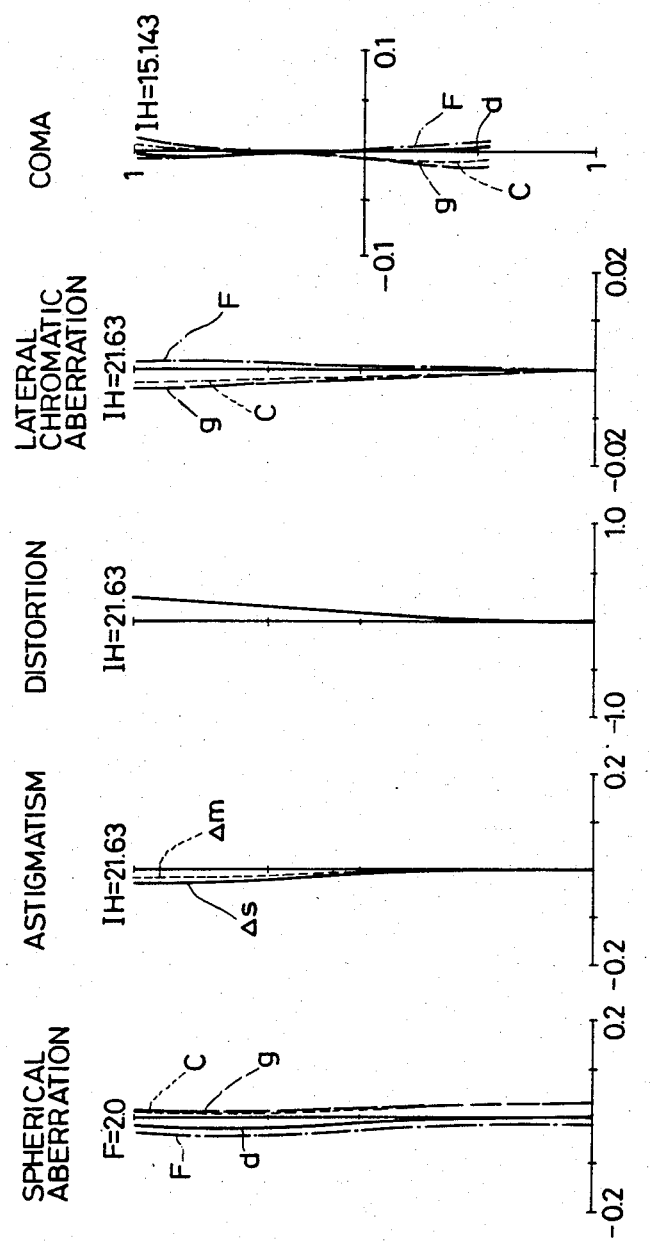
FIG. 8 through FIG. 10 show curves illustrating the aberration characteristics of Embodiment 3 of the present invention.
Figure 9:
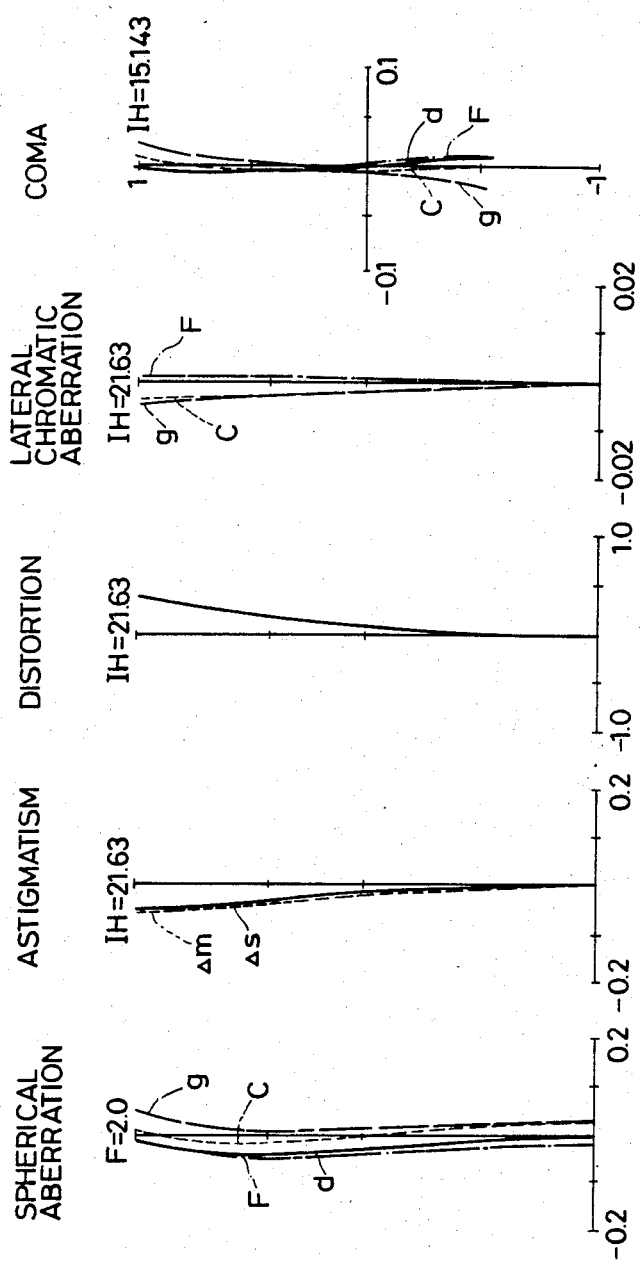
Figure 10:
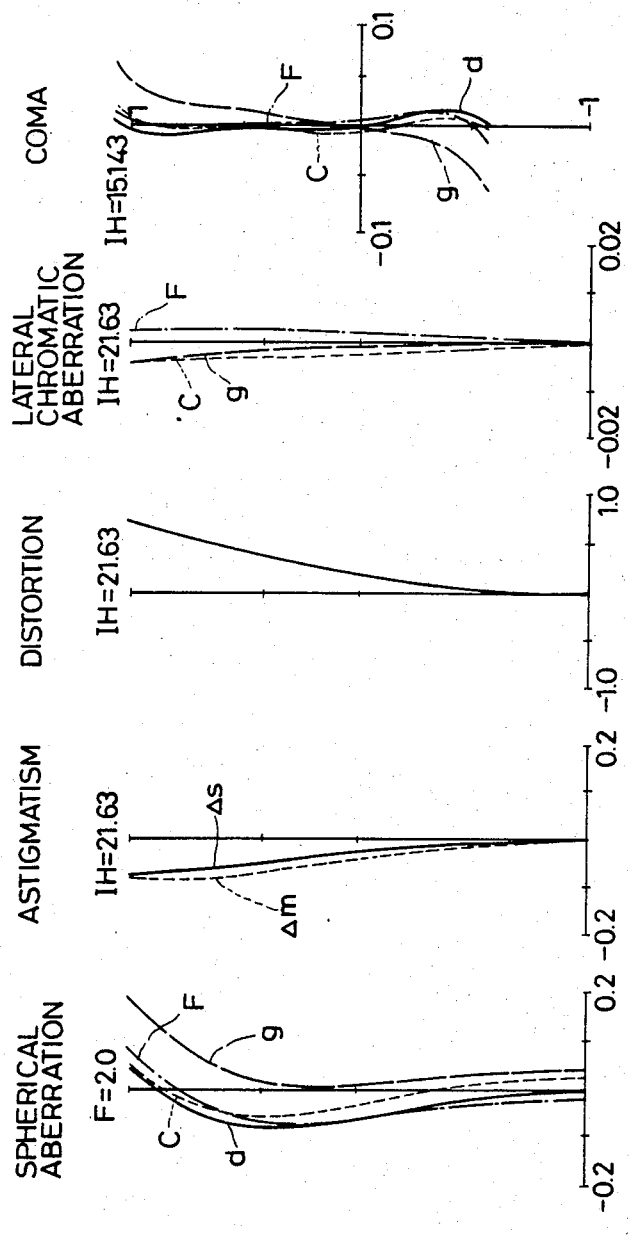
Figure 11:
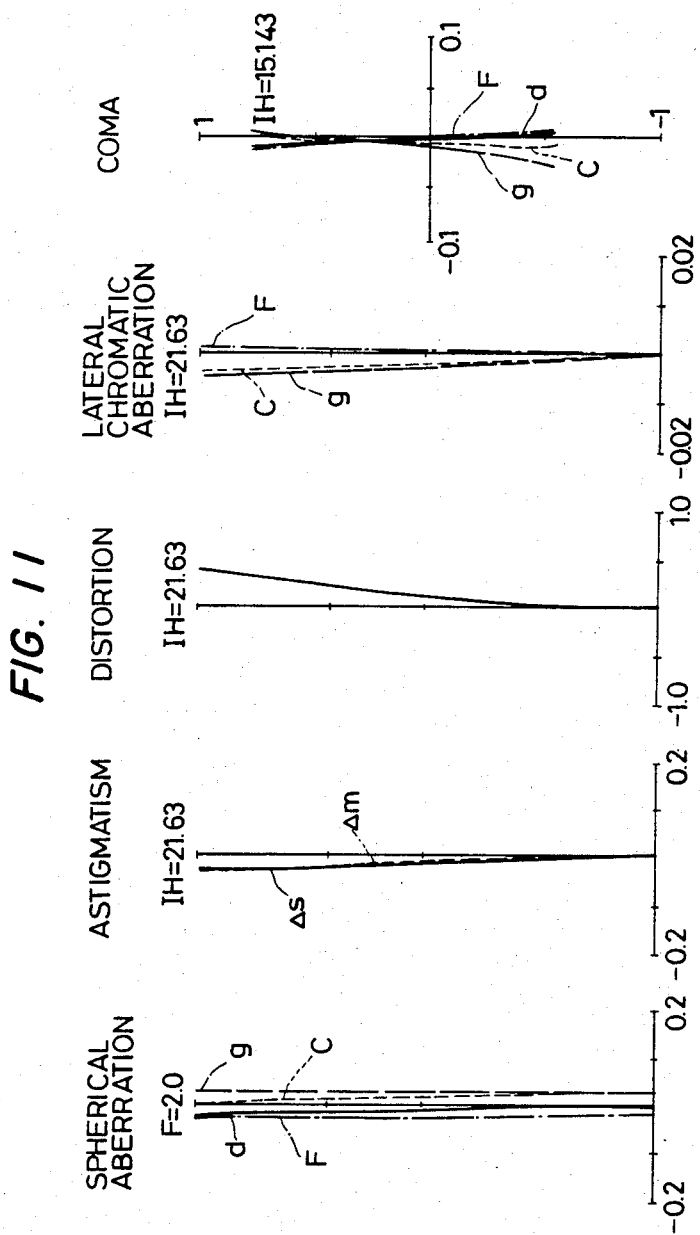
FIG. 11 through FIG. 13 show curves illustrating the aberration characteristics of Embodiment 4 of the present invention.
Figure 12:
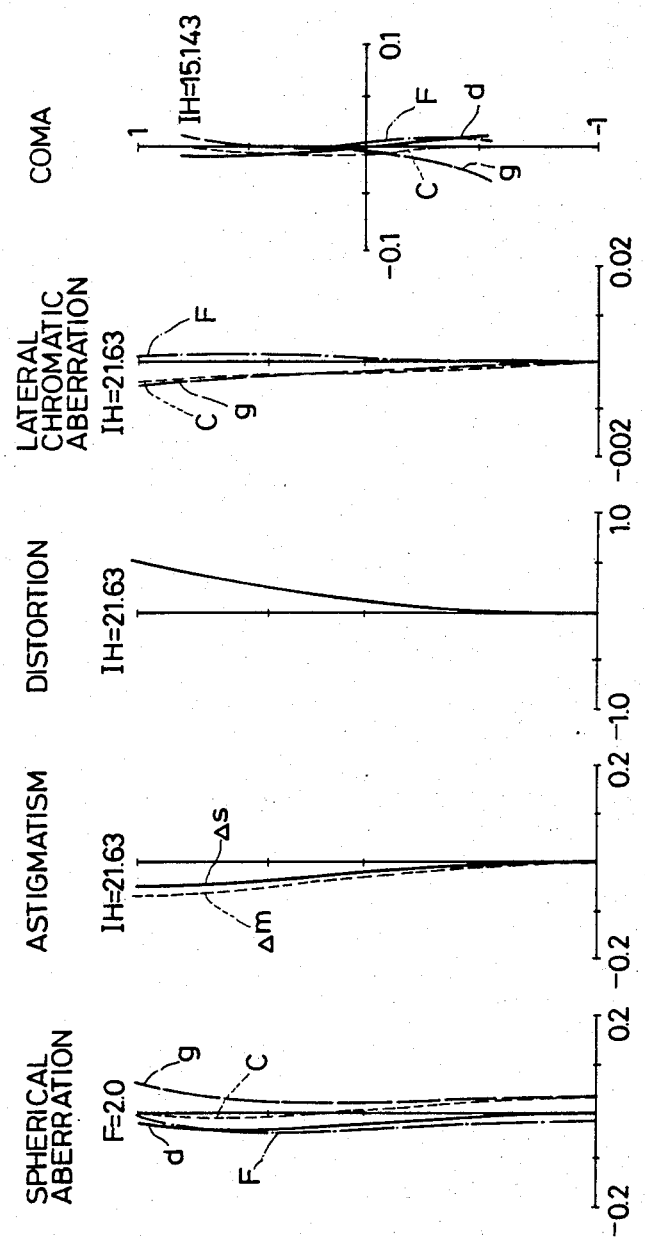
Figure 13:
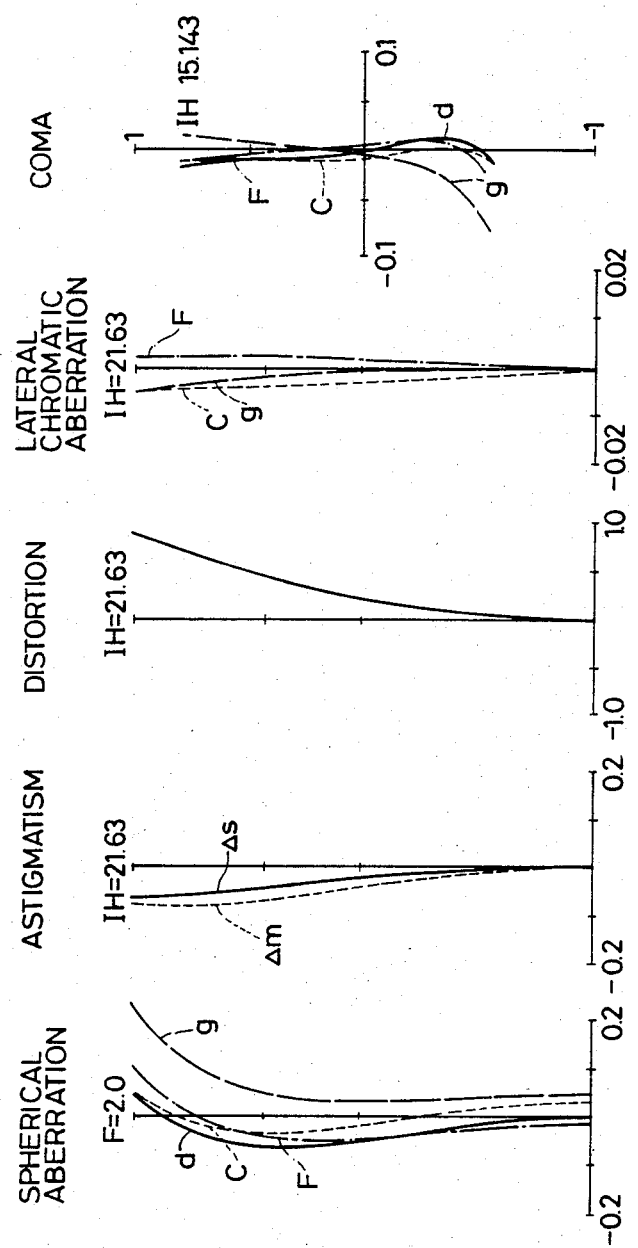

Aberration characteristics of these embodiments are visualized in FIG. 2 through FIG. 13. Out of these drawings, FIG. 2 through FIG. 4 show aberration characteristics of Embodiment 1 at object points of infinite distance, 3.05 m and 1.03 m. FIG. 5 through FIG. 7 show aberration characteristics of Embodiment 2 at object points of infinite distance 3.05 m and 1.03 m. FIG. 8 through FIG. 10 show aberration characteristics of Embodiment 3 at object points of infinite distance, 3.05 m and 1.03 m. FIG. 11 through FIG. 13 show aberration characteristics of Embodiment 4 at object points of infinite distance, 3.05 m and 1.03 m. All of these curves visualize the aberration characteristics of the embodiments equipped with the filter F.

I claim:

1. A large relative aperture ratio telephoto lens system comprising a first converging lens group, a diverging lens group and a second converging lens group, said first converging lens group comprising a first positive lens component, a second positive lens component, a negative lens component and a third positive lens component, said diverging lens group comprising two negative lens components, and said second converging lens group comprising a positive lens component, a negative lens component and a positive lens component; wherein at least one of the second and third lens components constituting said first converging lens group is arranged that Abbe's number is larger than 80 and partial dispersion ratio is larger than 0.53, and said first positive lens component and said negative lens component constituting said first converging lens group satisfying the following conditions (1) and (2):

$$\nu_1 > 80, \theta_1 > 0.53 \tag{1}$$

$$\nu_3 < 45, \theta_3 < 0.575 \tag{2}$$

wherein the reference symbols $\nu_1$ and $\theta_1$ represent Abbe's number and partial dispersion ratio of the first positive lens component arranged in said first converging lens group, and the reference symbols $\nu_3$ and $\theta_3$ designate Abbe's number and partial despersion ratio of the negative lens component arranged in said first converging lens group.

2. A large relative aperture ratio telephoto lens system according to claim 1 so adapted as to be focused on objects located at infinite to short distances by shifting the two negative cemented doublets arranged in said diverging lens group and said second converging lens group along the optical axis while changing their relative positional relationship.

3. A large relative aperture ratio telephoto lens system according to claim 2 satisfying the following condition (4) through (7):

$$0.7\phi < \phi_1 < 1.3\phi \tag{4}$$

$$\left(\phi = \frac{1}{f}, \phi_1 = \frac{1}{f_1}\right)$$

$$0.08 < n_5 - n_6 \tag{5}$$

$$10 < \nu_8 - \nu_7 < 45 \tag{6}$$

$$0.4f < \left|\left(\frac{1}{f_5} + \frac{1}{f_6}\right)^{-1}\right| < 0.55f \tag{7}$$

wherein the reference symbol f represents focal length of the telephoto lens system as a whole, the reference symbol $f_1$ designates focal length of the first positive lens component arranged in said first converging lens group, the reference symbol $f_5$ denotes focal length of the negative lens component arranged on the object side in said diverging lens group, the reference symbol $f_6$ represents focal length of the negative lens component arranged on the image side in said diverging lens group, the reference symbols $n_5$ and $n_6$ designate refractive indices of the two lens elements of the negative lens component arranged on the object side in said diverging lens group, and the reference symbols $\nu_7$ and $\nu_8$ denote Abbe's numbers of the two lens elements of the negative lens component arranged on the image side in said diverging lens group.

4. A large relative aperture ratio telephoto lens system according to claim 3 satisfying the following conditions (8) through (10):

$$0.08 < n_7 - n_8 \tag{8}$$

$$0.1 < n_9 - n_{10} \tag{9}$$

$$10 < \nu_{11} - \nu_{10} \tag{10}$$

wherein the reference symbols $n_7$ and $n_8$ represent refractive indices of the two lens elements of the negative lens component arranged on the image side in said diverging lens group, the reference symbols $n_9$ and $n_{10}$ designate refractive indices of the positive lens component on the object side and the negative lens component arranged in said second converging lens group, the reference symbols $\nu_{10}$ and $\nu_{11}$ denote Abbe's numbers of the negative lens component and positive lens component arranged on the image side in said second converging lens group.

5. A large relative aperture ratio telephoto lens system according to claim 4 wherein said second converging lens group consists of a positive lens component, and a cemented doublet consisting of a negative lens element and a positive lens element.

6. A large relative aperture ratio telephoto lens system according to claim 5 satisfying the following conditions:

$$\nu_2 > 80, \theta_2 > 0.53 \tag{3'}$$

wherein the reference symbols $\nu_2$ and $\theta_2$ represent Abbe's number and partial dispersion ratio of the second positive lens component arranged in said first converging lens group.

7. A large relative aperture ratio telephoto lens system according to claim 5 satisfying the following conditions:

$$\nu_4 > 80, \theta_4 > 0.53 \tag{3''}$$

wherein the reference symbol $\nu_4$ and $\theta_4$ represent Abbe's number and partial dispersion ratio of the third positive lens component arranged in said first converging lens group:

8. A large relative aperture ratio telephoto lens system according to claim 6 having the following numerical data:

$r_1 = 53.4890$
$\quad d_1 = 8.6598 \quad n_1 = 1.49700 \quad \nu_1 = 81.61$
$r_2 = -253.9770$
$\quad d_2 = 0.2021$
$r_3 = 47.1587$
$\quad d_3 = 6.8041 \quad n_2 = 1.49700 \quad \nu_2 = 81.61$
$r_4 = 372.5134$ -continued $\quad d_4 = 3.0103$
$r_5 = -310.9050$
$\quad d_5 = 2.8866 \quad n_3 = 1.65412 \quad \nu_3 = 39.70$
$r_6 = 34.3938$
$\quad d_6 = 2.8866$
$r_7 = 42.6486$
$\quad d_7 = 5.6082 \quad n_4 = 1.61800 \quad \nu_4 = 63.38$
$r_8 = 318.7505$
$\quad d_8 = D_1$
$r_9 = -85.4181$
$\quad d_9 = 3.5052 \quad n_5 = 1.73400 \quad \nu_5 = 51.49$
$r_{10} = -45.4995$
$\quad d_{10} = 2.0619 \quad n_6 = 1.46450 \quad \nu_6 = 65.94$
$r_{11} = 62.7660$
$\quad d_{11} = D_2$
$r_{12} = -1545.6106$
$\quad d_{12} = 3.2990 \quad n_7 = 1.68893 \quad \nu_7 = 31.08$
$r_{13} = -43.4010$
$\quad d_{13} = 1.6495 \quad n_8 = 1.50847 \quad \nu_8 = 61.83$
$r_{14} = 28.0698$
$\quad d_{14} = D_3$
$r_{15} = 53.8086$
$\quad d_{15} = 3.0928 \quad n_9 = 1.73400 \quad \nu_9 = 51.49$
$r_{16} = -44.0473$
$\quad d_{16} = 1.2371$
$r_{17} = -41.2192$
$\quad d_{17} = 1.2371 \quad n_{10} = 1.62004 \quad \nu_{10} = 36.25$
$r_{18} = 28.2067$
$\quad d_{18} = 2.7629 \quad n_{11} = 1.67790 \quad \nu_{11} = 55.33$
$r_{19} = -223.1966$
$f = 100, \quad 2\omega = 10.2°$
$\theta_1 = 0.53695, \quad \theta_2 = 0.53695, \quad \theta_3 = 0.56978$
$\theta_4 = 0.54359$
$f_1 = 89.7, \quad f_5 = -98.8, \quad f_6 = 69.7$ $$\left( \frac{1}{f_5} + \frac{1}{f_6} \right)^{-1} = -40.87$$

| object point | $D_1$ | $D_2$ | $D_3$ | f |
|---|---|---|---|---|
| ∞ | 12.622 | 4.991 | 17.684 | 100.000 |
| 3.05 m | 13.368 | 5.403 | 15.906 | 100.093 |
| 1.03 m | 15.709 | 6.434 | 11.915 | 99.882 | wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens element.

9. A large relative aperture ratio telephoto lens system according to claim 6 having the following numerical data:

$r_1 = 59.8879$
$\quad d_1 = 8.6593 \quad n_1 = 1.45650 \quad \nu_1 = 90.80$
$r_2 = -251.3768$
$\quad d_2 = 0.2021$
$r_3 = 44.1635$
$\quad d_3 = 6.8041 \quad n_2 = 1.49700 \quad \nu_2 = 81.61$
$r_4 = 233.0781$
$\quad d_4 = 3.0103$
$r_5 = -862.4809$
$\quad d_5 = 2.8866 \quad n_3 = 1.65412 \quad \nu_3 = 39.70$
$r_6 = 34.9286$
$\quad d_6 = 2.8866$
$r_7 = 42.2330$
$\quad d_7 = 5.6082 \quad n_4 = 1.61800 \quad \nu_4 = 63.38$
$r_8 = 1869.8698$
$\quad d_8 = D_1$
$r_9 = -78.7197$
$\quad d_9 = 3.5052 \quad n_5 = 1.73400 \quad \nu_5 = 51.49$
$r_{10} = -41.0364$
$\quad d_{10} = 2.0619 \quad n_6 = 1.46450 \quad \nu_6 = 65.94$ -continued

```
r₁₁ =  57.4054
       d₁₁ = D₂
r₁₂ = -396.6589
       d₁₂ = 3.2990      n₇ = 1.74077      ν₇ = 27.79
r₁₃ = -45.4103
       d₁₃ = 1.6495      n₈ = 1.50847      ν₈ = 60.83
r₁₄ =  26.7992
       d₁₄ = D₃
r₁₅ =  49.1045
       d₁₅ = 3.0923      n₉ = 1.77250      ν₉ = 49.66
r₁₆ = -46.2095
       d₁₆ = 1.2371
r₁₇ = -43.3235
       d₁₇ = 1.2371      n₁₀ = 1.64769     ν₁₀ = 33.80
r₁₈ =  28.8379
       d₁₈ = 2.7629      n₁₁ = 1.67790     ν₁₁ = 55.33
r₁₉ = -317.9854
       f = 100,          2ω = 10.2°
       θ₁ = 0.53479,     θ₂ = 0.53695,     θ₃ = 0.56978
       θ₄ = 0.54359
       f₁ = 106.9,       f₅ = -91.7,       f₆ = -63.7
```

$$\left(\frac{1}{f_5} + \frac{1}{f_6}\right)^{-1} = -37.59$$

| object point | D₁     | D₂    | D₃     | f       |
|--------------|--------|-------|--------|---------|
| ∞            | 13.454 | 5.287 | 17.882 | 100.000 |
| 3.05 m       | 14.120 | 5.699 | 16.850 | 100.115 |
| 1.03 m       | 16.195 | 6.730 | 15.201 | 99.906  | wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

10. A large relative aparture ratio telephoto lens system according to claim 7 having the following numerical data:

```
r₁  =  57.7405
       d₁  = 8.6598      n₁  = 1.45650     ν₁  = 90.80
r₂  = -259.0883
       d₂  = 0.2021
r₃  =  46.3425
       d₃  = 6.8041      n₂  = 1.61800     ν₂  = 63.38
r₄  =  218.5592
       d₄  = 3.0103
r₅  = -2292.057
       d₅  = 2.8866      n₃  = 1.65412     ν₃  = 39.70
r₆  =  33.3375
       d₆  = 2.8866
r₇  =  41.5626
       d₇  = 5.6082      n₄  = 1.49700     ν₄  = 81.61
r₈  =  345.6092
       d₈  = D₁
r₉  = -80.4007
       d₉  = 3.5052      n₅  = 1.73400     ν₅  = 51.49
r₁₀ = -48.8973
       d₁₀ = 2.0619      n₆  = 1.46450     ν₆  = 65.94
r₁₁ =  73.0621
       d₁₁ = D₂
r₁₂ =  387.0852
       d₁₂ = 3.2990      n₇  = 1.68893     ν₇  = 31.08
r₁₃ = -41.6552
       d₁₃ = 1.6495      n₈  = 1.51742     ν₈  = 52.41
r₁₄ =  29.3620
       d₁₄ = D₃
r₁₅ =  59.3546
       d₁₅ = 3.0928      n₉  = 1.73400     ν₉  = 51.49
r₁₆ = -43.3501
       d₁₆ = 1.2371
r₁₇ = -41.1688
       d₁₇ = 1.2371      n₁₀ = 1.61293     ν₁₀ = 37.00
r₁₈ =  29.1501
       d₁₈ = 2.7629      n₁₁ = 1.67790     ν₁₁ = 55.33
r₁₉ = -250.4883
       f = 100,          2ω = 10.2°
       θ₁ = 0.53479,     θ₂ = 0.54359,     θ₃ = 0.56978
       θ₄ = 0.53695
       f₁ = 104.3,       f₅ = -99.8,       f₆ = -86.5
```

$$\left(\frac{1}{f_5} + \frac{1}{f_6}\right)^{-1} = -46.34$$

| object point | D₁     | D₂    | D₃     | f       |
|--------------|--------|-------|--------|---------|
| ∞            | 14.205 | 4.076 | 18.300 | 100.000 |
| 3.05 m       | 15.056 | 4.488 | 16.418 | 100.040 |
| 1.03 m       | 17.732 | 5.519 | 12.092 | 99.817  | wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

11. A large relative aparture ratio telephoto lens system according to claim 7 having the following numerical data:

```
r₁  =  53.6493
       d₁  = 9.8969      n₁  = 1.49700     ν₁  = 81.61
r₂  = -233.4347
       d₂  = 0.2021
r₃  =  50.3090
       d₃  = 5.9794      n₂  = 1.61700     ν₂  = 62.79
r₄  =  192.5768
       d₄  = 3.0103
r₅  = -408.8411
       d₅  = 2.8866      n₃  = 1.65412     ν₃  = 39.70
r₆  =  33.9410
       d₆  = 2.8866
r₇  =  41.2077
       d₇  = 5.6082      n₄  = 1.49700     ν₄  = 81.61
r₈  =  747.8051
       d₈  = D₁
r₉  = -79.7637
       d₉  = 3.5032      n₅  = 1.73400     ν₅  = 51.49
r₁₀ = -49.0299
       d₁₀ = 2.0619      n₆  = 1.46450     ν₆  = 65.94
r₁₁ =  69.9918
       d₁₁ = D₂
r₁₂ =  626.3769
       d₁₂ = 3.2990      n₇  = 1.68893     ν₇  = 31.08
r₁₃ = -40.7052
       d₁₃ = 1.6495      n₈  = 1.51742     ν₈  = 52.41
r₁₄ =  30.5153
       d₁₄ = D₃
r₁₅ =  63.0751
       d₁₅ = 3.0928      n₉  = 1.77250     ν₉  = 49.66
r₁₆ = -44.3549
       d₁₆ = 1.2371
r₁₇ = -41.3072
       d₁₇ = 1.2371      n₁₀ = 1.62004     ν₁₀ = 36.25
r₁₈ =  29.8059
       d₁₈ = 2.7629      n₁₁ = 1.67790     ν₁₁ = 55.33
r₁₉ = -231.6445
       f = 100,          2ω = 10.2°
       θ₁ = 0.53695,     θ₂ = 0.54379,     θ₃ = 0.54978
       θ₄ = 0.53695
       f₁ = 88.8,        f₅ = -96.2,       f₆ = -86.8
```

$$\left(\frac{1}{f_5} + \frac{1}{f_6}\right)^{-1} = -45.63$$

-continued

| object point | $D_1$ | $D_2$ | $D_3$ | f |
|---|---|---|---|---|
| ∞ | 14.211 | 4.310 | 18.122 | 100.000 |
| 3.05 m | 15.144 | 4.722 | 16.158 | 100.085 |
| 1.03 m | 18.432 | 5.753 | 11.510 | 99.948 | wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

* * * * *